(12) United States Patent
Mizuno et al.

(10) Patent No.: US 10,876,950 B2
(45) Date of Patent: Dec. 29, 2020

(54) ANALYZING APPARATUS, SYSTEM, ANALYZING METHOD, AND PROGRAM

(71) Applicant: HORIBA, LTD., Kyoto (JP)

(72) Inventors: Yusuke Mizuno, Kyoto (JP); Tomoki Aoyama, Kyoto (JP); Kyoko Kassai, Kyoto (JP); Eiichi Nagaoka, Kyoto (JP); Shunsuke Murata, Kyoto (JP)

(73) Assignee: HORIBA, LTD., Kyoto (JP)

( * ) Notice: Subject to any disclaimer, the term of this patent is extended or adjusted under 35 U.S.C. 154(b) by 127 days.

(21) Appl. No.: 16/035,578

(22) Filed: Jul. 13, 2018

(65) Prior Publication Data

US 2019/0017916 A1   Jan. 17, 2019

(30) Foreign Application Priority Data

Jul. 14, 2017   (JP) .................. 2017-138604

(51) Int. Cl.
*G01N 15/06* (2006.01)
*G01N 23/223* (2006.01)
*G06T 7/90* (2017.01)
*G06K 9/46* (2006.01)
*G01N 15/00* (2006.01)

(52) U.S. Cl.
CPC ..... *G01N 15/0612* (2013.01); *G01N 15/0625* (2013.01); *G01N 23/223* (2013.01); *G06K 9/4647* (2013.01); *G06T 7/90* (2017.01); *G01N 2015/0046* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 9,606,249 B2 | 3/2017 | Mizuno et al. | |
| 2015/0338357 A1* | 11/2015 | Mizuno | G01T 7/04 378/45 |
| 2019/0258046 A1* | 8/2019 | Gallagher-Gruber | G02B 21/361 |

FOREIGN PATENT DOCUMENTS

JP   2015219197 A   12/2015

* cited by examiner

*Primary Examiner* — Fan Zhang
(74) *Attorney, Agent, or Firm* — Brooks Kushman PC

(57) ABSTRACT

An analyzing apparatus includes a collection filter, a two-dimensional sensor, and a calculation unit. The collection filter collects fine particulate matter included in the air. The two-dimensional sensor obtains collection image data including a collection area of the collection filter in which the fine particulate matter is collected. The calculation unit calculates data relating to content of the colored particulate matter included in the collection area based on the collection image data.

12 Claims, 16 Drawing Sheets

ANALYZING APPARATUS, SYSTEM, ANALYZING METHOD, AND PROGRAM

CROSS-REFERENCE TO RELATED APPLICATIONS

This application claims priority under 35 U.S.C. § 119 to Japanese Patent Application No. 2017-138604 filed on Jul. 14, 2017, the disclosure of which is hereby incorporated by reference in its entirety.

TECHNICAL FIELD

The disclosure relates to an analyzing apparatus for analyzing particulate matter, a system for identifying a source of particulate matter, an analyzing method thereof, and a program that causes a computer to perform the method.

BACKGROUND

In recent years, floating particulate matter (e.g. PM2.5) included in the atmosphere is a large environmental problem. To reduce generation of floating particulate matter, it may be necessary to identify a source of floating particulate matter, and for this purpose a method and an apparatus for estimating a source of floating particulate matter have been developed.

For example, there is known an apparatus that measures mass concentration of floating particulate matter based on the intensity of β-ray passing through floating particulate matter collected on a collection filter, and analyzes elements included in the floating particulate matter based on fluorescent X-rays generated from the floating particulate matter.

This apparatus can perform continuous analysis of floating particulate matter by collecting floating particulate matter every predetermined time.

SUMMARY

Floating particulate matter may contain particulate matter having a color (hereinafter referred to as colored particulate matter) such as a substance called black carbon whose main component is carbon and generated by open burning or the like, for example. Some colored particulate matters are considered to be a main cause of global warming and/or to affect human body because of its possibility of having carcinogenicity or the like. Accordingly, there is increasing demand for an analyzing apparatus that can analyze data relating to content of colored particulate matter in the atmosphere, such as concentration of colored particulate matter.

One or more embodiments of the present disclosure obtain data relating to colored particulate matter.

A plurality of aspects as means for solving the problem are described below. These aspects can be arbitrarily combined as necessary.

An analyzing apparatus according to one aspect of the present invention includes a collection filter, a two-dimensional sensor, and a calculation unit. The collection filter collects particulate matter included in the atmosphere. The two-dimensional sensor obtains two-dimensional collection image data including a collection area of the collection filter in which the particulate matter is collected. The calculation unit calculates data relating to content of the colored particulate matter included in the collection area based on the collection image data.

In this way, data that is used to calculate the data relating to content of the colored particulate matter can be obtained at high speed, and therefore the data relating to content of the colored particulate matter can be calculated at high speed.

The analyzing apparatus may further include a plate member disposed on a side of the collection filter opposite to a side facing the two-dimensional sensor. In this way, the collection image data can be more conspicuous.

The analyzing apparatus may further include a collection amount measuring unit configured to measure data that is used to calculate data relating to collection amount of the particulate matter collected on the collection filter. In this way, the data relating to collection amount of the particulate matter can be obtained.

The analyzing apparatus may further include an element analysis unit configured to analyze an element included in the particulate matter collected on the collection filter. In this way, element analysis of the particulate matter can be performed.

The calculation unit may output the collection image data in a visually recognizable form. In this way, it can be checked whether or not the collection area is placed at a proper position.

The calculation unit may store the collection image data and an analysis result of the particulate matter collected in the collection area indicated in the collection image data, in association with time when the collection image data is obtained. In this way, collection image data and/or analysis result obtained at specific past time can be checked.

The collection image data may contain two-dimensional first image data indicating the collection area. In this case, the calculation unit calculates the data relating to content of the colored particulate matter based on a first luminance of pixels in the first image data. In this way, the data relating to content of the colored particulate matter can be calculated at high speed.

The calculation unit may calculate the data relating to content of the colored particulate matter based on an integrated value of luminance of pixels in the first image data. In this way, the data relating to content of the colored particulate matter can be accurately calculated.

The collection image data may contain two-dimensional second image data indicating a non-collection area of the collection filter in which the particulate matter is not collected. In this case, the calculation unit calculates first background data indicating a background of luminance of pixels in the collection image data using luminance of pixels in the second image data, and calculates the data relating to content of the colored particulate matter based on the corrected data calculated based on the collection image data and the first background data.

In this way, the background of luminance included in the collection image data can be removed by simple calculation.

The collection image data may further contain two-dimensional second image data indicating a non-collection area of the collection filter in which the particulate matter is not collected. In this case, the calculation unit calculates the data relating to content of the colored particulate matter based on the first luminance and a second luminance of pixels in the second image data.

In this way, the data relating to content of the colored particulate matter can be calculated more accurately.

The calculation unit may calculate the data relating to content of the colored particulate matter based on the first luminance at which a first peak appears in distribution of luminance of pixels included in the first image data, and the second luminance at which a second peak appears in distribution of luminance of pixels in the second image data.

In this way, the data relating to content of the colored particulate matter can be calculated at high speed in relatively easy way.

The two-dimensional sensor may obtain second background data as two-dimensional image data obtained when the particulate matter is not collected on surface of the collection filter corresponding to at least a part of a view field of the two-dimensional sensor. In this case, the calculation unit calculates the data relating to content of the colored particulate matter based on corrected image data calculated based on the collection image data and the second background data.

In this way, the data relating to content of the colored particulate matter can be accurately calculated.

A system according to another aspect of the present invention includes the analyzing apparatus described above, and a source identifying device. The source identifying device is configured to identify a source of the particulate matter based on data that is used to identify a source of the particulate matter and data obtained by the analyzing apparatus. In this way, a source of the colored particulate matter can be identified.

An analyzing method according to still another aspect of the present invention includes the steps of: collecting particulate matter included in the atmosphere on a collection filter; obtaining two-dimensional collection image data including a collection area of the collection filter in which the particulate matter is collected; and calculating data relating to content of the colored particulate matter included in the collection area based on the collection image data.

The collection image data that is used to calculate the data relating to content of the colored particulate matter is obtained in a two-dimensional manner, and hence the data that is used to calculate the data relating to content of the colored particulate matter is obtained at high speed, so that the data relating to content of the colored particulate matter can be calculated at high speed.

A program according to still another aspect of the present invention is a program that causes a computer to perform an analyzing method described above. The program may be stored in a storage medium that the computer can read.

The data that is used to calculate the data relating to content of the colored particulate matter can be obtained at high speed, and the data relating to content of the colored particulate matter can be measured at high speed.

DETAILED DESCRIPTION

1. First Embodiment (1) General Outlines of Analyzing Apparatus

An analyzing apparatus 100 according to a first embodiment is described below. The analyzing apparatus 100 according to the first embodiment is placed in a source of dangerous particulate matter or its vicinity, and analyzes particulate matter generated from the source or the like. For example, it is placed along a heavy traffic road (a main road or a highway) or its vicinity, or in an industrial area that may generate particulate matter, or its vicinity.

The analyzing apparatus 100 measures data relating to colored particulate matter having a color. Approximately 90% of colored particulate matter is particles having large carbon content such as black carbon having black color, or brown carbon. Therefore, the measurement of data relating to colored particulate matter can be reworded as measurement of data relating to black carbon content.

The data described above can be, for example, an absolute quantity (weight) of black carbon collected in a collection area (described later), and/or a concentration of black carbon in the atmosphere (e.g. $\mu g/m^3$ or $mg/m^3$).

(2) Structure of Analyzing Apparatus

Figure 1:
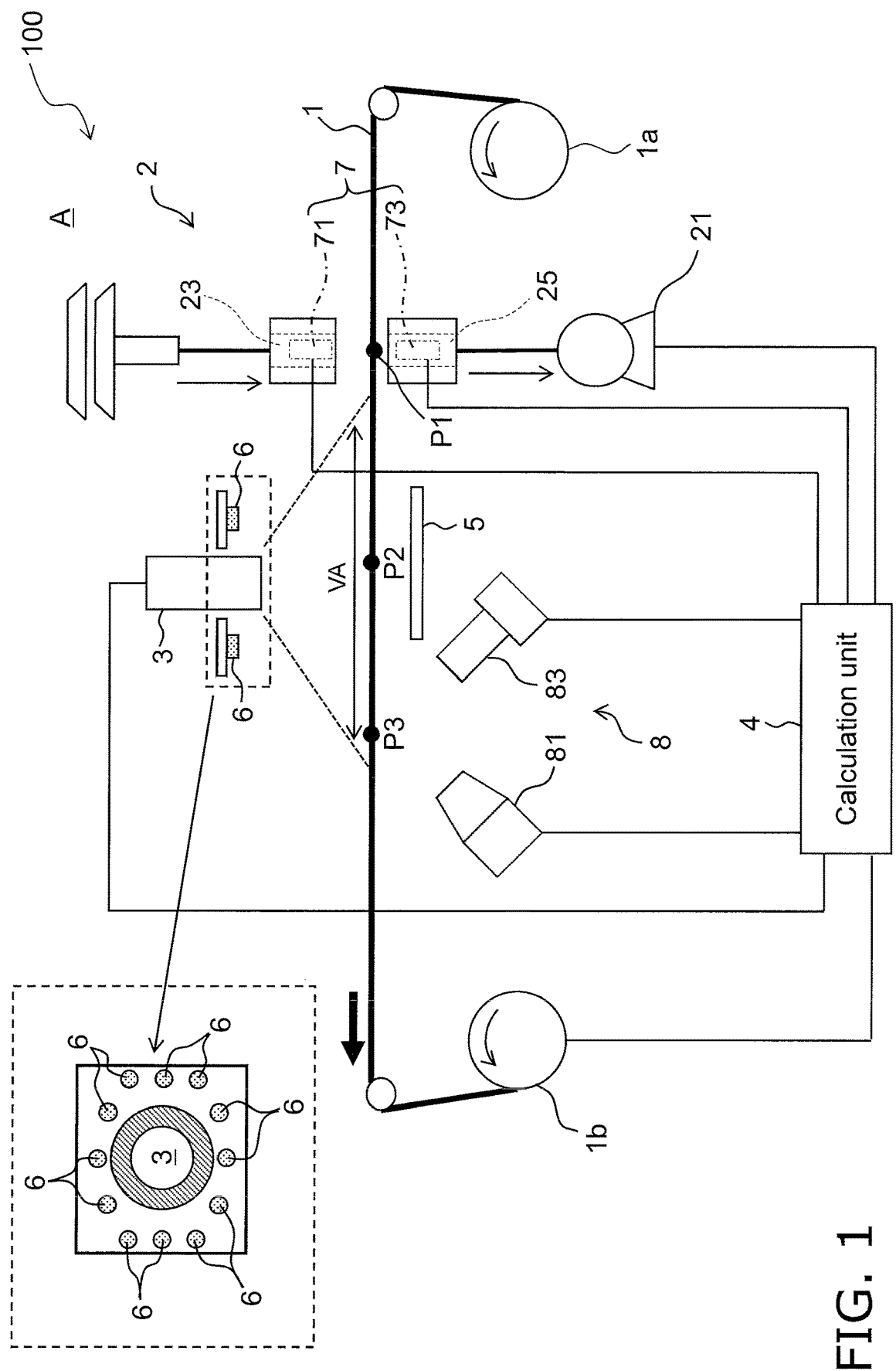
FIG. 1 is a diagram showing a structure of an analyzing apparatus.

Referring to FIG. 1, a structure of the analyzing apparatus 100 according to the first embodiment is described. FIG. 1 is a diagram showing a structure of the analyzing apparatus.

The analyzing apparatus 100 includes a collection filter 1. The collection filter 1 is, for example, a white color tape member including a reinforcement layer and a collection layer that is formed and laminated on the reinforcement layer. The reinforcement layer is a nonwoven fabric of polymeric material (such as polyethylene), for example. The collection layer has pores that can collect fine particulate matter FP (having a particle diameter of 2.5 μm or less) (one example of the particulate matter). The collection layer is made of fluorocarbon resin material, for example. In the collection filter 1, an area in which the fine particulate matter FP is collected is referred to as a "collection area". An one-layer glass filter, a one-layer fluorocarbon resin material filter, or the like can also be used as the collection filter 1.

The collection filter 1 is sent out from a sending-out reel 1a and is wound up by a winding reel 1b so that it can move in the length direction (the direction shown by a thick arrow in FIG. 1).

The analyzing apparatus 100 includes a collection unit 2. The collection unit 2 is disposed in the place corresponding to a first position P1 in the length direction of the collection filter 1. The collection unit 2 includes a suction pump 21, a discharge port 23, and a suction port 25. When the suction pump 21 generates a suction force in the suction port 25, the air A is discharged from the discharge port 23 to the first position P1 of the collection filter 1, and the collection area collects the fine particulate matter FP.

As described above, the first position P1 is a position in the length direction of the collection filter 1 at which the fine particulate matter FP is collected, and hence it can also be referred to as a "collection position".

The analyzing apparatus 100 includes a two-dimensional sensor 3. The two-dimensional sensor 3 is, for example, a CCD image sensor in which charge coupled devices (CCDs) are arranged in a two-dimensional array, or a CMOS image sensor in which light receiving elements are arranged in an array. In addition, the two-dimensional sensor 3 includes an optical member such as a wide-angle lens to obtain image data of a wider view field area VA.

The two-dimensional sensor 3 is disposed at a second position P2 of the length direction of the collection filter 1 such that its light receiving surface faces the surface of the collection filter 1 collecting the fine particulate matter FP. As described later, the second position P2 is a position to which the collection area moves so that the two-dimensional sensor 3 obtains collection image data IM containing the collection area, and hence it can also be referred to as an "imaging position".

In addition, the two-dimensional sensor 3 is disposed at a predetermined height from the surface of the collection filter 1. The second position P2 is, for example, a midpoint between the first position P1 and a third position P3 at which element analysis is performed.

Figure 2:
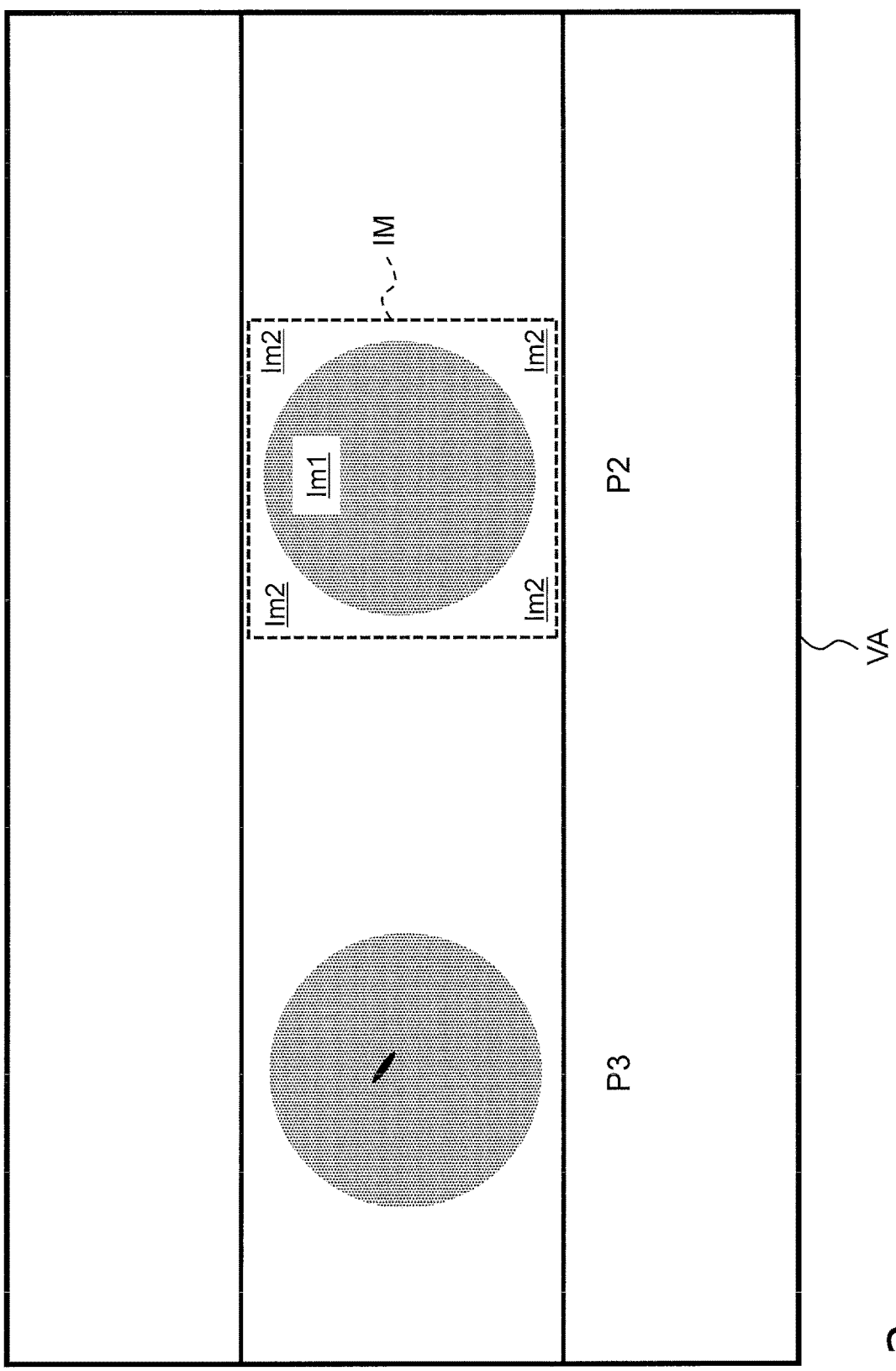
FIG. 2 is a diagram showing one example of image data in a view field area.

With the above-described two-dimensional sensor 3, the image data of the view field area VA including the second position P2 and the third position P3 can be obtained as shown in FIG. 2. FIG. 2 is a diagram showing one example of the image data of the view field area. It should be noted that, although the view field area VA includes an image of an analysis unit 8, such as an X-ray source 81 and etc. (described later) that exist in the vicinity of the third position P3, the image of the analysis unit 8 (the X-ray source 81 and etc.) is omitted in FIG. 2 for easier understanding of FIG. 2.

The view field area VA can be widened by increasing the number of pixels of the two-dimensional sensor 3, and/or by increasing the height of the light receiving surface of the two-dimensional sensor 3 as much as possible. In addition, by widening the view field area VA, the view field area VA may include the first position P1 (collection position).

When the collection area moves to the second position P2, the two-dimensional sensor 3 obtains the image data of the view field area VA. After that, as shown in FIG. 2, the collection image data IM is cropped as two-dimensional image data containing the collection area, from the image data of the view field area VA obtained by the two-dimensional sensor 3. Alternatively, a portion of the image data of the view field area VA that includes the second position P2 and its vicinity may be used as the collection image data IM in the analysis.

As shown in FIG. 2, the collection image data IM includes first image data Im1 and second image data Im2.

The first image data Im1 is image data of the collection area that exists at the second position P2. The second image data Im2 is image data of a non-collection area that exists around the collection area and is included in the view field area VA.

As described above, the view field area VA includes not only the second position P2 but also the third position P3. Therefore, by showing the image data of the view field area VA on a display 45 of a calculation unit 4, for example, it can be checked and monitored whether or not a foreign material exists in the collection area or the non-collection area that exists at the third position P3, and whether or not an error is occurred in the analysis unit 8 and etc. The error can also be notified, for example.

In addition, since the two-dimensional sensor 3 can obtain the collection image data IM in a period of approximately 1/60 sec (corresponding to one frame display period of a moving picture), for example, the first image data Im1 of the collection area and the second image data Im2 of the non-collection area can be simultaneously obtained at high speed.

It should be noted that, when the collection area does not exist at the second position P2, the two-dimensional sensor 3 may obtain the image data of the view field area VA including the non-collection area, and a second background data, which is described later, may be cropped from the image data of the view field area VA.

In other words, the second background data is two-dimensional image data obtained when the fine particulate matter FP is not collected on the surface of the collection filter 1 corresponding to at least a part of the view field area VA.

Figure 3:
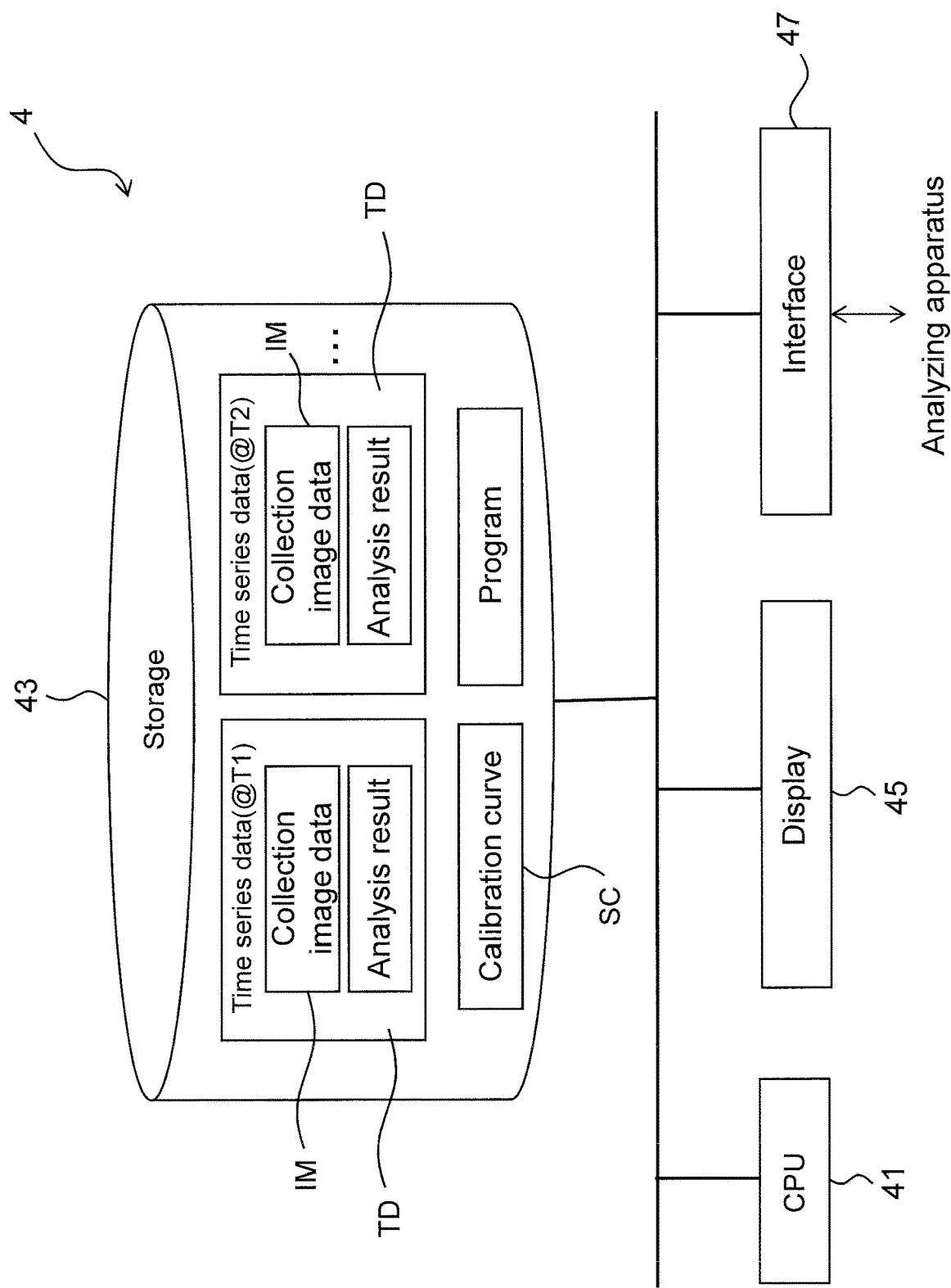
FIG. 3 is a diagram showing a structure of a calculation unit.

The analyzing apparatus 100 includes a calculation unit 4. The calculation unit 4 is a computer system including, for example, a CPU 41, a storage 43 that is a part or a whole of a storage area of a storage such as a RAM or a ROM, a display 45 (e.g. a liquid crystal display or the like), and various interfaces 47 for input and output of data and signals, signal conversion, and the like with individual portions of the analyzing apparatus 100 (e.g. an I/O port, a communication interface, and the like), as shown in FIG. 3. FIG. 3 is a diagram showing a structure of the calculation unit.

Various controls and information processing performed by the calculation unit 4 may be realized by a program that is stored in the storage unit 43 and can be executed by a computer system constituting the calculation unit 4.

The storage 43 stores various settings of the analyzing apparatus 100. Specifically, the storage 43 stores a calibration curve SC. The calibration curve SC is used for calculating data relating to black carbon content using a parameter (e.g. luminance) of pixels in the collection image data IM.

In addition, the storage 43 stores time series data TD. The collection image data IM and the data relating to black carbon content calculated from the collection image data IM are stored, as the time series data TD, in association with time when the collection image data IM is obtained (T1, T2, and so on).

According to another embodiment, the time series data TD may further be associated with data relating to collection amount of the fine particulate matter FP in the collection area and/or an element analysis result.

In response to a request from a user, for example, the calculation unit 4 displays the collection image data IM associated with time designated by the user, and data relating to black carbon content (and the above-mentioned analysis result of fine particulate matter FP) in the time series data TD on the display 45.

In this way, data that is used to calculate the data relating to content of the colored particulate matter can be obtained at high speed, and therefore the data relating to content of the colored particulate matter can be calculated at high speed.

The analyzing apparatus 100 includes a plate member 5. The plate member 5 is disposed on the side of the collection filter 1 opposite to a side facing the two-dimensional sensor 3 in the view field area VA, when the two-dimensional sensor 3 obtains the two-dimensional image data of the collection area and/or non-collection area. If the plate member 5 does not excessively transmit light, the plate member 5 may have an arbitrary thickness. In other words, the plate member 5 may be a thick plate or a thin film that does not transmit excessive light, for example.

Since the collection filter 1 is member having a small thickness, when a light source 6 emits light to the collection filter 1, most of the light passes through the collection filter 1 and is reflected by the surfaces existing in the back of the collection filter 1. In addition, the light is also reflected by the plate member 5 disposed on the back side of the collection filter 1.

In this case, when the image of the collection filter 1 is obtained, the state of the image can be changed by surface reflection characteristics of the plate member 5. The "surface reflection characteristics" means general reflection characteristics including reflectance to specular reflection light and reflectance including influence of diffuse reflection, etc.

In order to prevent the obtained image from being changed by the surface reflection characteristics, the plate members 5 having various surface reflection characteristics have been tried. According to a result of this experiment, it is found preferable that the plate member 5 has substantially the same surface reflection characteristics as the collection filter 1.

With the plate member 5, a difference between a first luminance Br1 and a second luminance Br2 of pixels included in the collection image data IM can be conspicuous.

In addition, for example, when the two-dimensional sensor 3 obtains color image data, the color image data can be accurately converted into image data having a luminance distribution by equalizing the surface reflection characteristics of the plate member 5 and the surface reflection characteristics of the collection filter 1.

As described above, the plate member 5 can prevent an object in the back of the collection filter 1 from becoming a background of the collection image data IM. In addition, the plate member 5 can equalize light intensity in the view field area VA by equalizing the surface reflection characteristics of the collection filter 1. Therefore, the plate member 5 can be referred to as a "background compensator" that equalizes intensity of light from the background of the collection image data IM.

According to another embodiment, a member with a higher absorption rate of light (e.g. 99.99%) such as black color non-reflective sheet may be used as the plate member 5. Using the member with a higher absorption rate of light as the plate member 5, it can be completely prevented that the light generated from the light source 6, which is described later, is reflected by other members of the analyzing apparatus 100 and the reflected light is generated, for example. As a result, an influence of multiple reflection is eliminated, and accuracy of detecting the collection area using the collection image data IM can be further increased. Alternatively, coating of a higher absorption rate of light may be applied to the plate member 5.

The analyzing apparatus 100 includes a plurality of light sources 6. The light source 6 is a surface mount type white color LED. The plurality of light sources 6 are arranged such that the view field area VA of the two-dimensional sensor 3 can be illuminated uniformly. In this embodiment, as shown in the diagram of the light source 6 of FIG. 1 that is viewed from the collection filter 1 side (the diagram enclosed by a broken line in FIG. 1), the plurality of light sources 6 are disposed on a substrate with a predetermined intervals on an ellipse that has a major axis parallel to the length direction of the collection filter 1. In this way, the light can be uniformly illuminated in wide range in the length direction of the collection filter 1. The length of the major axis and/or minor axis of the ellipse on which the plurality of light sources 6 are disposed can be appropriately determined according to a ratio between vertical and horizontal lengths of the view field area VA.

In addition, the plurality of light sources 6 can be disposed on a periphery of an arbitrary shape other than the ellipse according to a shape of the view field area VA.

In addition, since the light source 6 is the surface mount type, a distance between the light source 6 and the surface of the collection filter 1 can be increased, and hence a wide range of the surface of the collection filter 1 can be uniformly illuminated with appropriate intensity of light, without disposing, in front of the light source 6, a member such as a diffuser to diffuse the light from the light source 6.

The substrate on which the light source 6 is mounted has an opening smaller than the ellipse on which the plurality of light sources 6 are disposed. The two-dimensional sensor 3 is disposed such that its light receiving surface protrudes from the opening.

Since the analyzing apparatus 100 includes the light source 6 having the structure described above, the view field area VA can be illuminated such that clearer collection image data IM can be obtained. In addition, as the view field area VA is uniformly illuminated, it is possible to avoid obtaining image data affected by the intensity distribution of light generated from the light source 6.

The analyzing apparatus 100 includes a collection amount measuring unit 7. The collection amount measuring unit 7 includes a β-ray source 71 and a β-ray detector 73. The β-ray source 71 is disposed inside the discharge port 23 and emits β-rays to the first position P1. The β-ray detector 73 is disposed in the suction port 25 to face the β-ray source 71 and measures the intensity of β-rays passing through the collection area. The intensity of the β-rays measured by the β-ray detector 73 is used for calculating data relating to the collection amount of the fine particulate matter FP collected in the collection area (mass concentration of the fine particulate matter FP).

The analyzing apparatus 100 includes an element analysis unit 8. The element analysis unit 8 is disposed at the third position P3. The element analysis unit 8 includes an X-ray source 81 and a detector 83. The X-ray source 81 irradiates the fine particulate matter FP at the third position P3 with an X-ray. The detector 83 detects fluorescent X-rays generated from the fine particulate matter FP irradiated with X-rays from the X-ray source 81. The fluorescent X-rays detected by the detector 83 are used for element analysis of the fine particulate matter FP.

In this way, the third position P3 is a position to which the collection area moves for performing the element analysis of the fine particulate matter FP, and hence it can be referred to as an "analysis position".

(3) Principle of Calculating Data Relating to Black Carbon Content in First Embodiment A principle of calculating the data relating to black carbon content based on the collection image data IM is described below.

Figure 4:
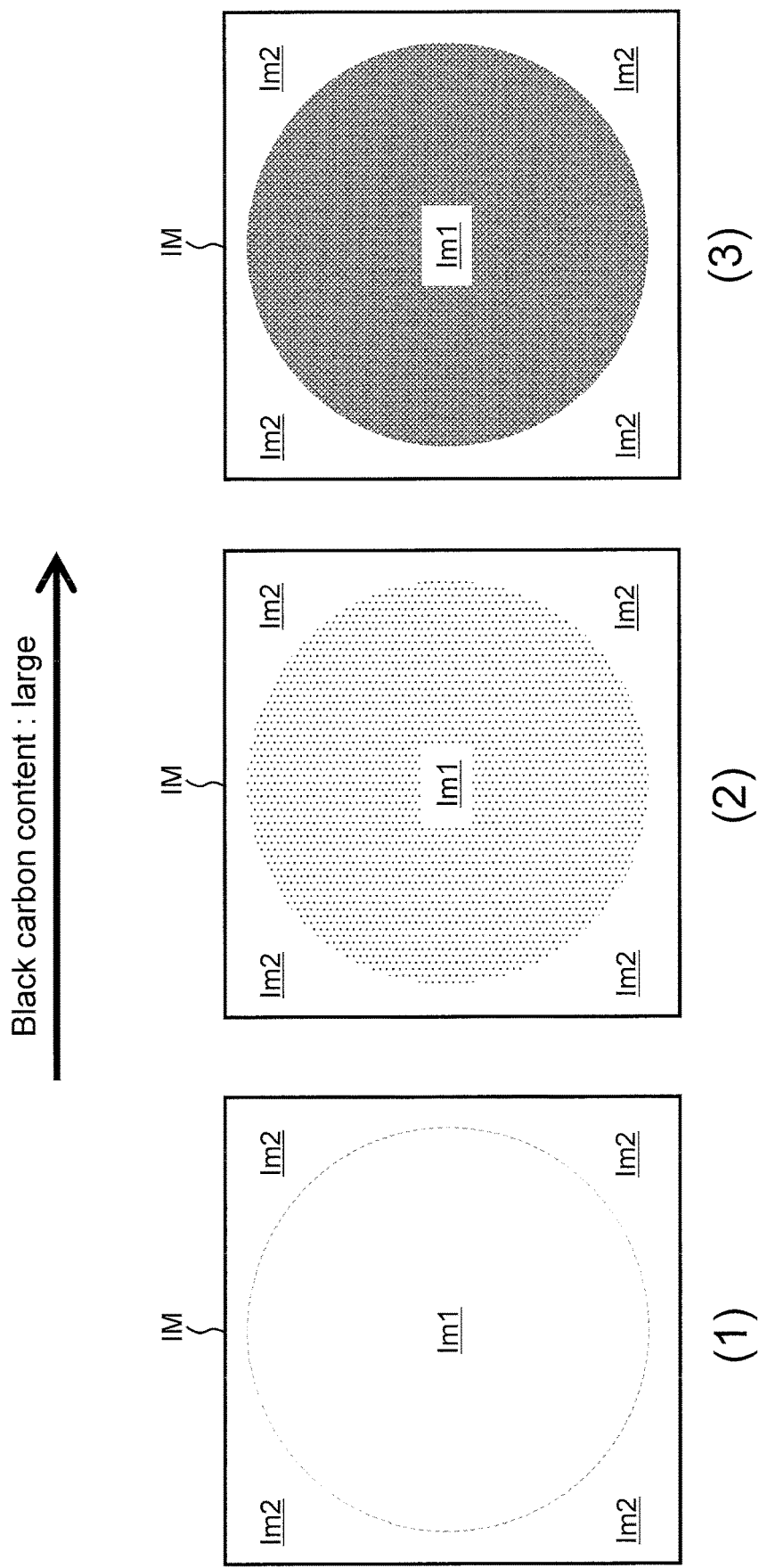
FIG. 4 is a diagram showing one example of a relationship between collection image data and black carbon content in a collection area.

First, referring to FIG. 4, a relationship between the black carbon content and the collection image data IM is described. FIG. 4 is a diagram showing one example of a relationship between the collection image data and the black carbon content in the collection area.

A state of the collection image data IM changes according to the black carbon content as shown in (1) to (3) of FIG. 4. In FIG. 4, (1) shows a case where the collection area contains no or little black carbon, (3) shows a case where the collection area contains black carbon in large content, and (2) shows a case where the collection area contains medium amount of black carbon content. In this way, the more the black carbon content in the collection becomes, the lower the luminance of the image part indicating the collection area becomes.

Figure 5:
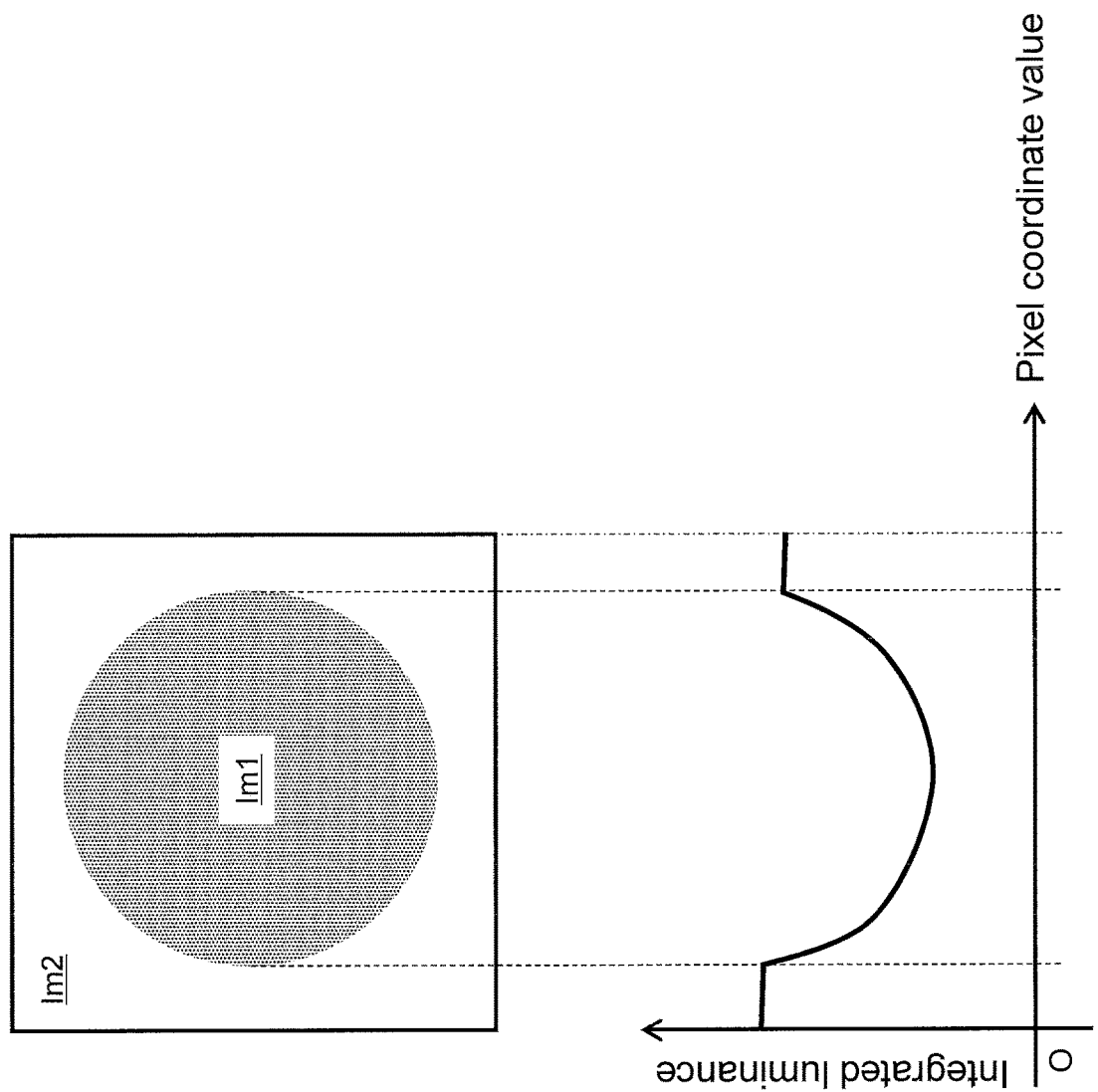
FIG. 5 is a diagram showing one example of an integrated luminance distribution.

In addition, for example, when luminance of pixels existing in the vertical axis direction of the collection image data IM is integrated, and the luminance that is integrated (referred to as integrated luminance) is plotted at each coordinate on the horizontal axis of the collection image data IM, the data indicating distribution of the integrated luminance is obtained as shown in the lower part of FIG. 5. Hereinafter, the data indicating the distribution of the integrated luminance shown in FIG. 5 is referred to as "integrated luminance distribution." In this distribution, the integrated luminance at a boundary between the first image data Im1 and the second image data Im2 is changed rapidly. FIG. 5 is a diagram showing one example of the integrated luminance distribution.

Figure 6:
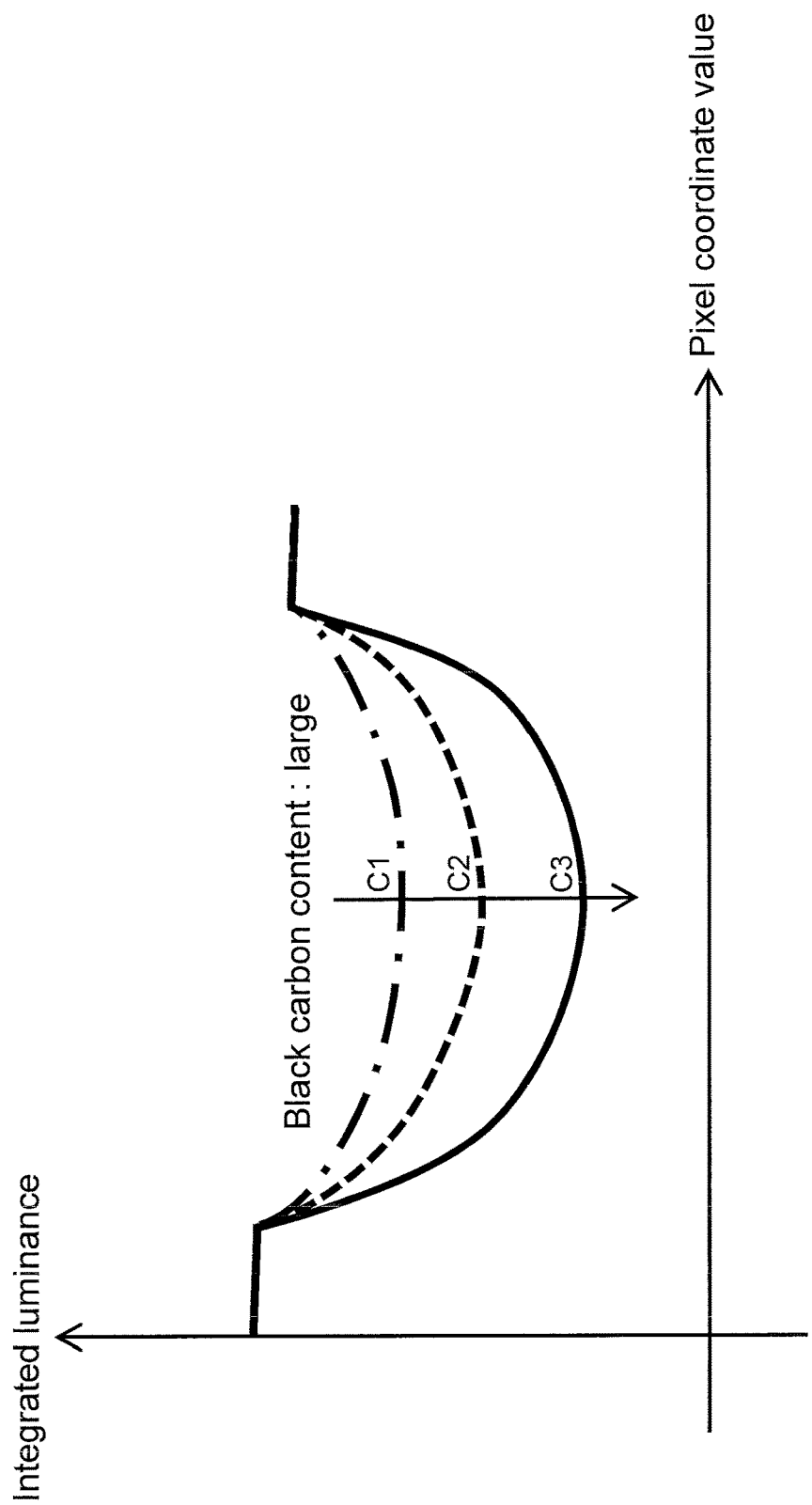
FIG. 6 is a diagram showing one example of dependence of the integrated luminance distribution on the black carbon content.

In addition, as shown in FIG. 6, it was found that the integrated luminance tends to become smaller as the black carbon content in the collection area increases. FIG. 6 is a diagram showing one example of dependence of the integrated luminance distribution on the black carbon content. In FIG. 6, a solid line indicates the integrated luminance distribution when the black carbon content is C3, a broken line indicates the integrated luminance distribution when the content is C2, and a dot-dashed line indicates the integrated luminance distribution when the content is C1 (C1<C2<C3).

Figure 7:
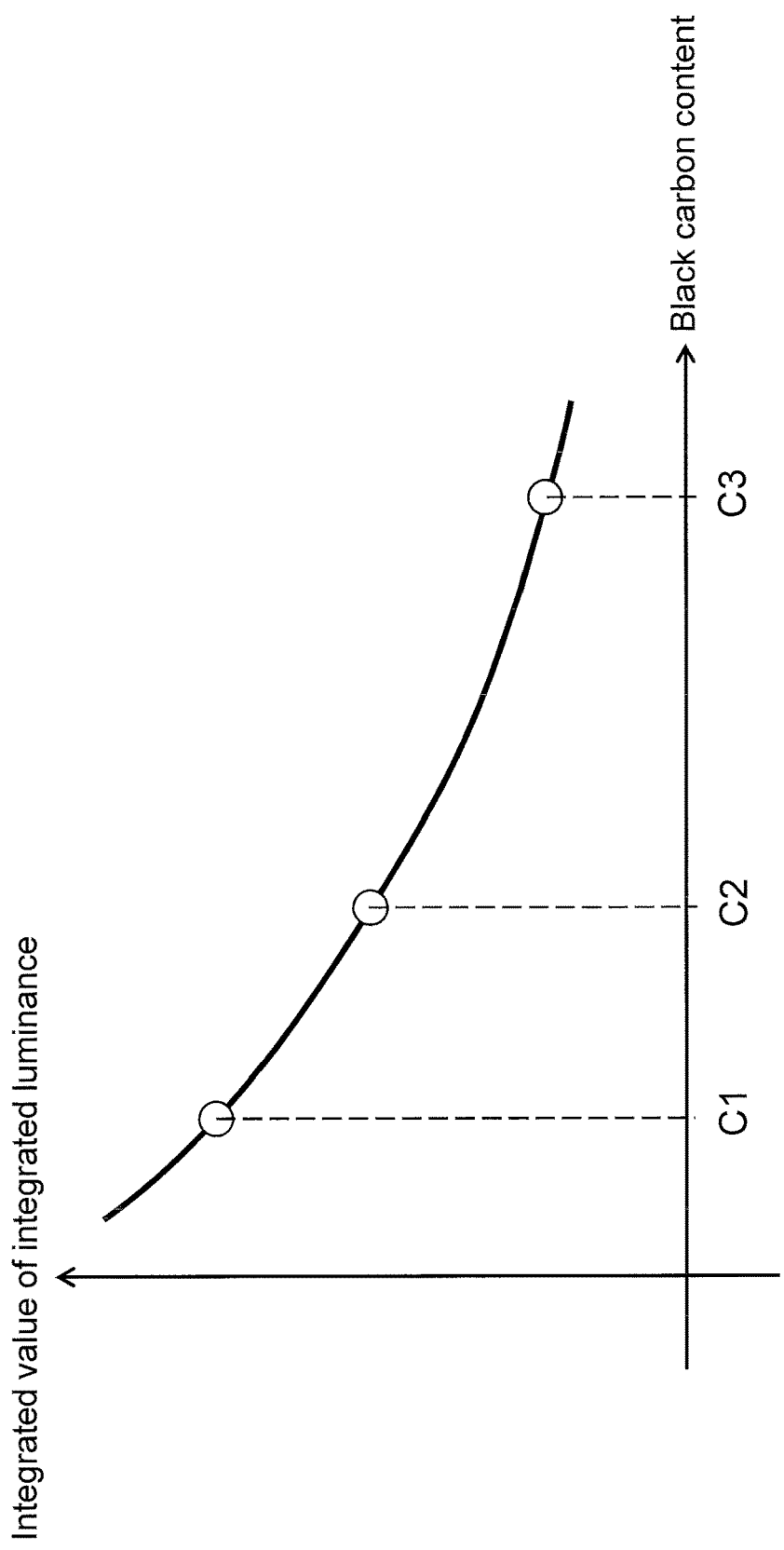
FIG. 7 is a diagram showing one example of a relationship between the black carbon content and an integrated value of luminance of pixels included in first image data.

Further, as shown in FIG. 7, it was found that there is a strong correlation between the integrated value of luminance of pixels included in the first image data Im1 obtained by further integrating the integrated luminance, and the black carbon content.

FIG. 7 is a diagram showing one example of a relationship between the black carbon content and the integrated value of luminance of pixels included in the first image data.

Therefore, in this embodiment, data indicating a relationship between the black carbon content and the integrated value of luminance of pixels included in the first image data Im1 is used as the calibration curve SC.

By using this calibration curve SC for calculating the data relating to black carbon content, for example, the data relating to black carbon content in the collection area can be accurately calculated with little influence of a variation in the collection amount of the black carbon in the collection area.

According to another embodiment, the calculation unit 4 may calculate the data relating to black carbon content based on the integrated value of luminance of pixels at positions along a predetermined direction of the first image data Im1 (that is not limited to the horizontal axis or the vertical axis). In this way, computational complexity can be reduced in calculating the data relating to black carbon content.

According to still another embodiment, for example, if there is a spot in the collection area at which the fine particulate matter FP cannot be (or can be hardly) collected due to a member of the collection unit 2, luminance of pixels of the first image data Im1 corresponding to the spot may not be counted when the integrated value is calculated. In addition, if an area surrounded by the spot is formed in the collection area, luminance of pixels in the area may be integrated.

In this way, the data relating to black carbon content can be accurately calculated.

(4) Analysis Operation

Figure 8:
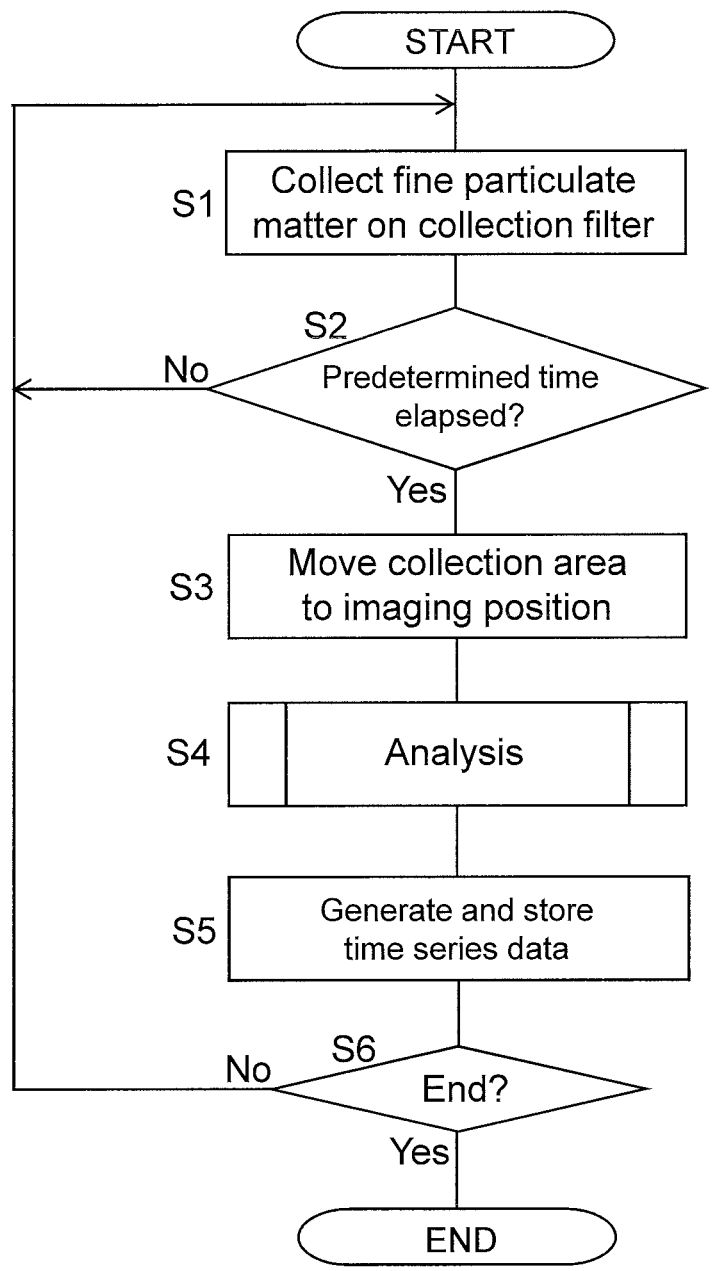
FIG. 8 is a flowchart showing the entire operation of the analyzing apparatus.
Figure 9:
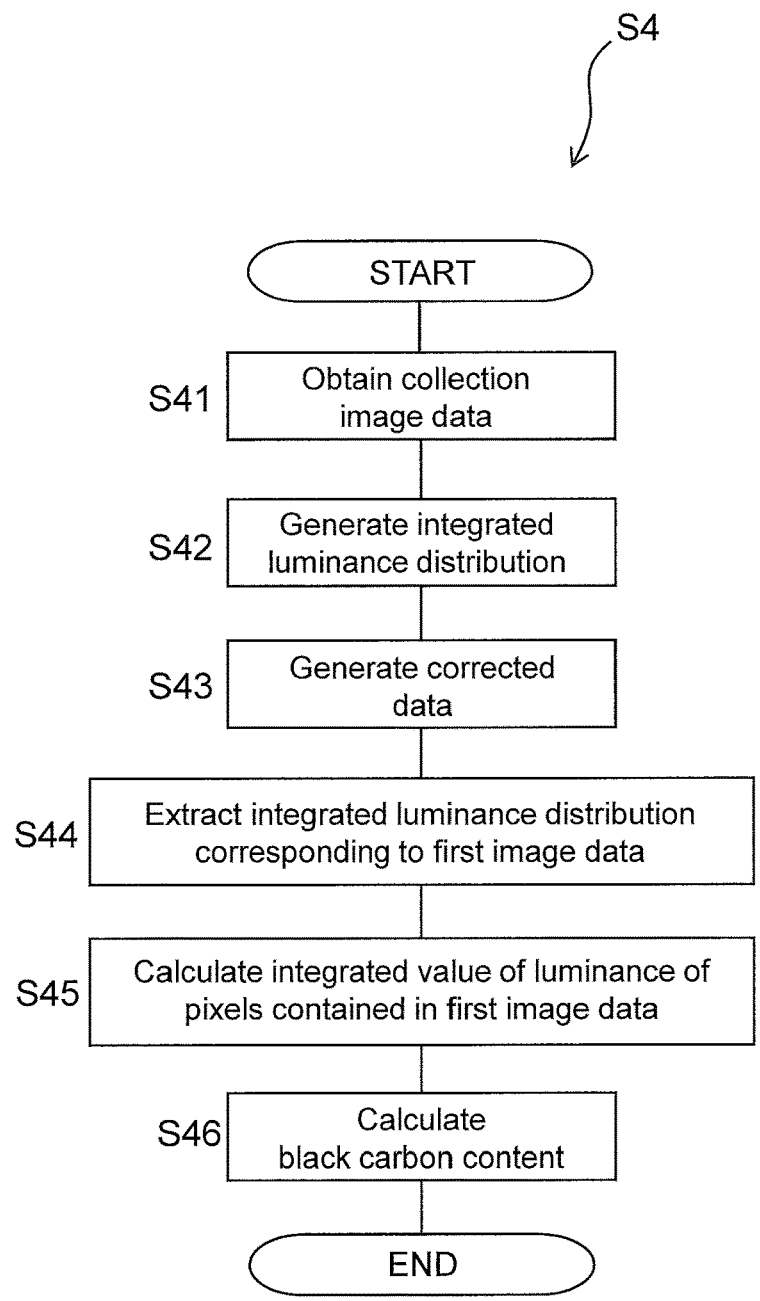
FIG. 9 is a flowchart showing an operation for analyzing fine particulate matter in a first embodiment.

Referring to FIGS. 8 and 9, an operation of the analyzing apparatus 100 when analyzing the fine particulate matter FP is described. FIG. 8 is a diagram showing the entire operation of the analyzing apparatus. FIG. 9 is a flowchart of an operation for analyzing fine particulate matter in the first embodiment.

The collection unit 2 first collects the fine particulate matter FP on the collection filter 1 for a predetermined time in Steps S1 to S2, and after moving the collection area to the imaging position (second position P2 in this embodiment) in Step S3, the analysis operation is performed in Step S4.

In Step S41 of the analysis operation, the plate member 5 is first positioned just below the collection filter 1, and then the light source 6 irradiates light to the surface of the collection filter 1 within the view field area VA. While irradiating light to the surface of the collection filter 1, the two-dimensional sensor 3 obtains the image data of the view field area VA. The calculation unit 4 then crops the two-dimensional image data including the collection area as the collection image data IM from the obtained image data of the view field area VA.

Since the position of the two-dimensional sensor 3 and the imaging position (second position P2) are fixed, the position of the collection image data IM in the image data of the view field area VA is also fixed. Therefore, the calculation unit 4 can obtain, for example, pixels within the range of predetermined coordinate values in the image data of the view field area VA (coordinate values that are in advance defined as coordinates at which the collection image data IM exists), as the collection image data IM.

The calculation unit 4 may also recognize the collection area (image thereof) included in the image data of the view field area VA and the collection filter 1, using image recognition processing or the like, and may crop an area including the collection area and the collection filter 1 as the collection image data IM from the image data of the view field area VA.

After executing Step S41, in Step S42, the calculation unit 4 performs a process of gray-scaling or the like on the collection image data IM, and then generates the integrated luminance distribution.

For example, the integrated luminance distribution is obtained by repeating integration of luminance of pixels along the vertical axis of the collection image data IM for one coordinate value on the horizontal axis of the collection image data IM while changing the coordinate value on the horizontal axis. In other words, the integrated luminance distribution is obtained as a relationship between the coordinate value on the horizontal axis and the integrated value of luminance (integrated luminance).

Figure 10:
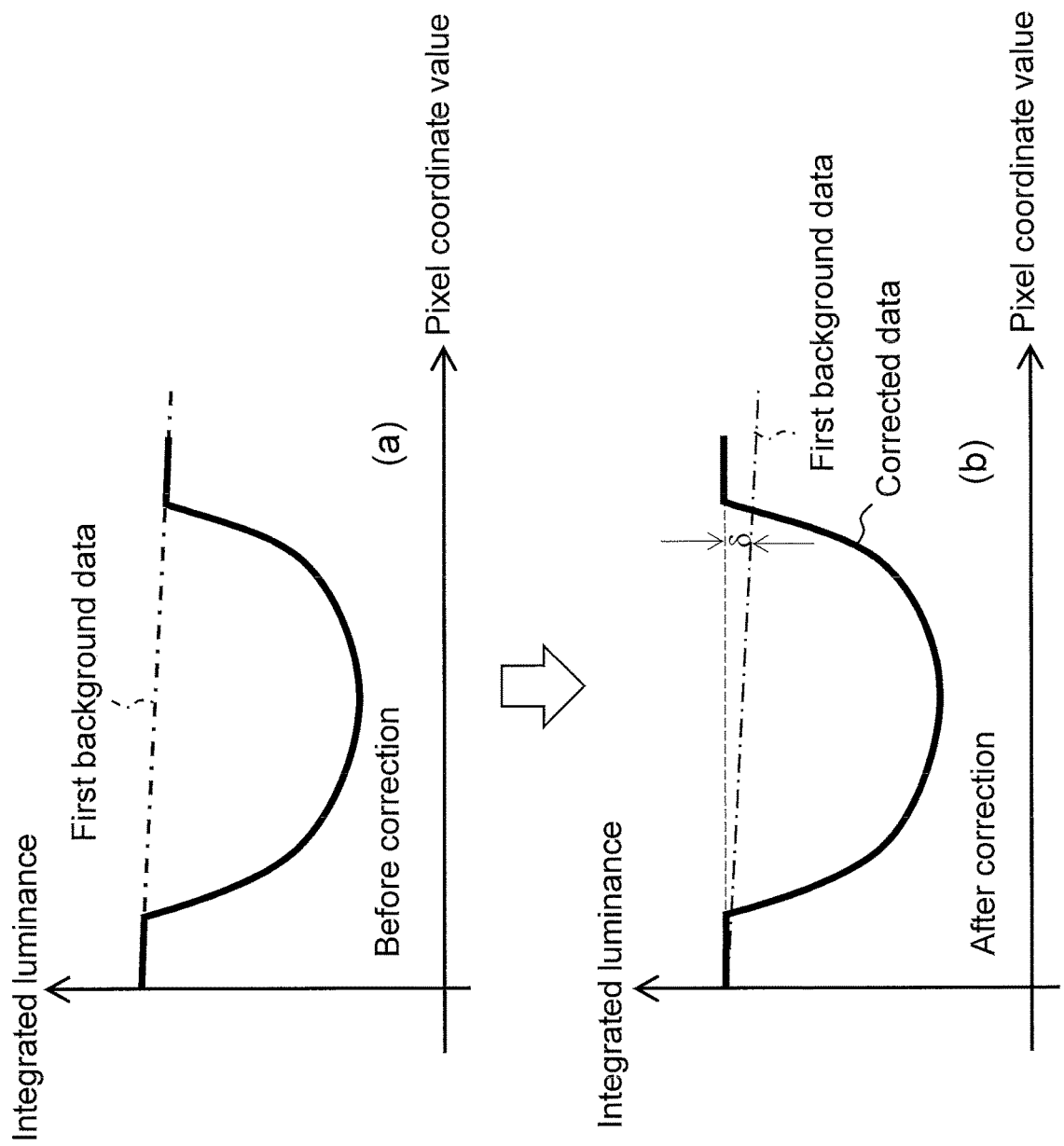
FIG. 10 is a diagram schematically showing generation of corrected data.

After calculating the integrated luminance distribution, in Step S43, the calculation unit 4 removes a background included in the integrated luminance distribution to generate the corrected data. A specific method of generating the corrected data is described below, referring to FIG. 10. FIG. 10 is a diagram schematically showing generation of the corrected data.

First, as shown in (a) of FIG. 10, a first background data is calculated by linear approximation or the like of data of a part corresponding to the second image data Im2 (image data in the non-collection area) in the integrated luminance distribution generated in Step S42. The first background data is data indicating a background of luminance of pixels in the collection image data IM. In (a) of FIG. 10, the first background data is shown by a dot-dashed line.

After that, a difference δ between a predetermined integrated luminance value in the background (e.g. the maximum value of the integrated luminance in the first background data) and the integrated luminance value in the first background data at each coordinate value is added to the integrated luminance value at the coordinate value corresponding to the integrated luminance distribution in the collection image data IM, to generate the corrected data (a solid line) as shown in (b) of FIG. 10. In the corrected data, a part corresponding to the second image data Im2 has constant integrated luminance.

According to another embodiment, the corrected data may be a difference between the integrated luminance distribution of the collection image data IM and the first background data. In this case, the calibration curve SC is generated such that the integrated value of the integrated luminance increases as the black carbon content increases.

According to still another embodiment, the background of the collection image data IM may be corrected by using image data indicating only the non-collection area (referred to as background image data) instead of or in combination with the background correction using the first background data.

For example, the corrected data can be generated by calculating an absolute value of a difference between luminance of each pixel in the collection image data IM and luminance of a corresponding pixel in the background image data for all pixels in the collection image data IM.

After the corrected data is generated, the integrated luminance distribution that is existed between edges in the corrected data is extracted as the integrated luminance distribution corresponding to the first image data Im1 in Step S44. The edge in the corrected data is defined as a coordinate value when the gradient of the integrated luminance value in the corrected data rapidly changes and can be detected by calculating differential of the corrected data, for example.

After executing Step S44, in Step S45, the integrated luminance value in the integrated luminance distribution corresponding to the first image data Im1 is further integrated to calculate the integrated value of luminance of pixels included in the first image data Im1.

Further integrating the integrated luminance value included in the integrated luminance distribution corresponds to calculating the integrated value of luminance (integrated luminance value) of pixels along one axis direction in the first image data Im1 and then integrating the integrated luminance value along another axis direction perpendicular to the one axis direction. After all, integrating the integrated luminance value included in the integrated luminance distribution is equivalent to integrating luminance values of all pixels included in the image data.

Next, in Step S46, using the integrated value of luminance of pixels included in the calculated first image data Im1 and the calibration curve SC, data relating to black carbon content included in the atmosphere is calculated.

By performing Steps S41 to S46 described above, the analyzing apparatus 100 can accurately calculate the data relating to black carbon content at high speed based on the integrated value of the luminance of pixels in the first image data Im1 (the first luminance Br1).

After the data relating to black carbon content is calculated, the collection area is moved from the imaging position (second position P2) to the analysis position (third position P3), and the element analysis unit 8 performs element analysis of the fine particulate matter FP included in the collection area.

After executing Step 4, in Step S5, the collection image data IM to be analyzed and the analysis result of the fine particulate matter FP (the data relating to black carbon content, the data relating to the collection amount of the fine particulate matter FP, and/or the element analysis result) are associated with time when the collection image data IM is obtained to generate the time series data TD and store it in the storage unit 43.

Steps S1 to S5 described above are repeatedly performed until the analysis is stopped. In other words, the analysis of the fine particulate matter FP is continuously performed.

As described above, after obtaining the collection image data IM by moving the collection area to the imaging position, the element analysis is performed by moving the collection area to the analysis position. Thus, collection of the fine particulate matter FP, acquisition of the collection image data IM, and the element analysis of the fine particulate matter FP can be performed at the same time.

According to another embodiment, the collection area may be stayed at the imaging position (second position P2) for a short time (1/60 seconds in the shortest) to obtain the collection image data IM, and then the collection area may be moved from the imaging position (second position P2) to the analysis position (third position P3). Since the two-dimensional sensor 3 can obtain the image data at a high speed, the collection image data IM including sufficient information can be obtained only by keeping the collection area at the imaging position for a short time.

In addition, the process of calculating the data relating to black carbon content from the collection image data IM may be performed while moving the collection area from the imaging position to the analysis position.

In this way, it is possible to prevent the collection area from staying for excessively long time at the imaging position, thus the analysis efficiency of the fine particulate matter FP can be enhanced.

2. Second Embodiment (1) Outline of Second Embodiment

In a second embodiment, the data relating to black carbon content is calculated using a luminance histogram described later.

It should be noted that, in the second embodiment, only a method of calculating the data relating to black carbon content using the collection image data IM is different from that in the first embodiment, and the structure of the analyzing apparatus 100 is the same as that in the first embodiment. Therefore, the description of the structure of the analyzing apparatus 100 and functions of individual structures is omitted, and only the luminance histogram and the analysis operation in Step S4 are described.

(2) Luminance Histogram

Figure 11:
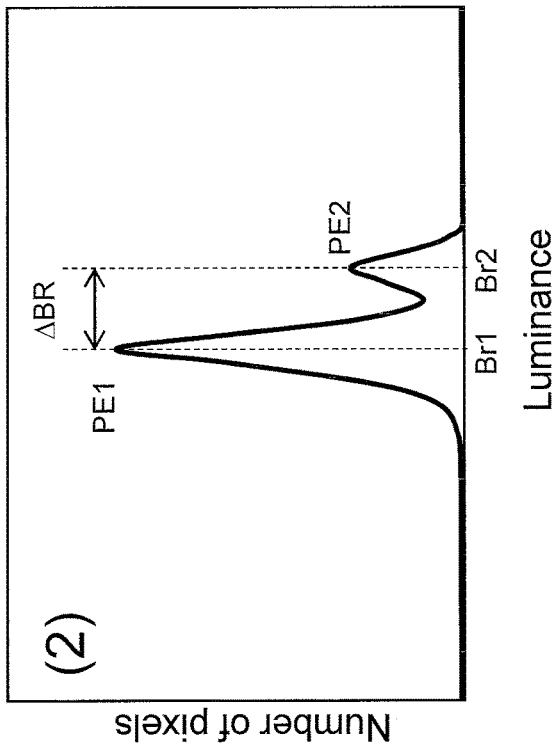
FIG. 11 is a diagram showing one example of a relationship between a luminance histogram and the black carbon content in the collection area.
Figure 11:
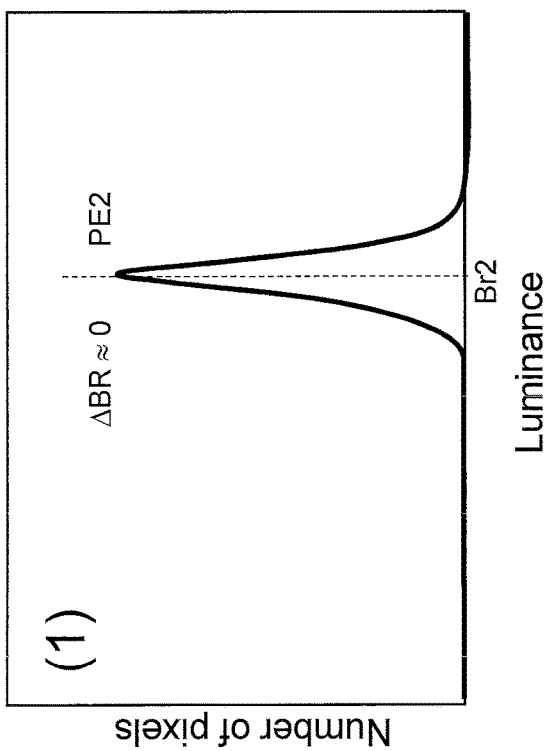
Figure 11:
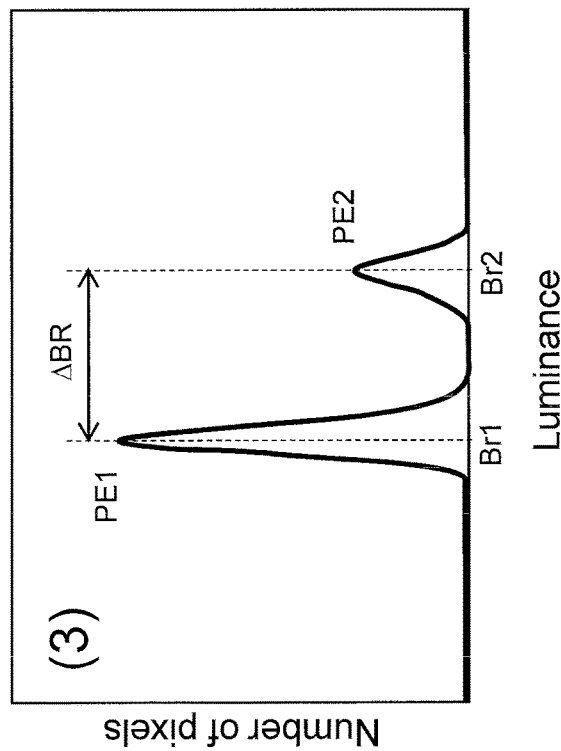

First, referring to FIG. 11, a luminance histogram used for calculating the data relating to black carbon content is described. The luminance histogram is data in which luminance that each pixel in the collection image data IM can have and the number of pixels having a specific luminance included in the collection image data IM are associated with each other. For example, the luminance histograms of the collection image data IM shown in (1) to (3) of FIG. 4 are calculated and shown in (1) to (3) of FIG. 11.

FIG. 11 is a diagram showing one example of a relationship between the luminance histogram and the black carbon content in the collection area. In FIG. 11, the histogram (1) shows the luminance histogram in a case where the collection area contains no (or little) black carbon, the histogram (3) shows the luminance histogram in a case where the collection area contains much black carbon content, and the histogram (2) shows the luminance histogram in a case where the collection area contains medium amount of black carbon content.

Here, it is found that the luminance histogram shown in FIG. 11 has the following characteristics:
(i) When the collection area contains no (or little) black carbon, only a second peak PE2 is seen at the second luminance Br2;
(ii) When a luminance difference is generated between the collection area and the non-collection area by containing black carbon in the collection area, two peaks, i.e. a first peak PE1 and the second peak PE2 are seen in the luminance histogram; and
(iii) A difference (ΔBR in FIG. 11) between the first luminance Br1 at which the first peak PE1 appears and the second luminance Br2 at which the second peak PE2 appears increases as the black carbon content increases.

In the luminance histogram shown in FIG. 11, the first luminance Br1 is smaller than the second luminance Br2, and hence the first luminance Br1 indicates a typical luminance of the pixels included in the first image data Im1, and the second luminance Br2 indicates a typical luminance of the pixels included in the second image data Im2.

(3) Analysis Operation in Second Embodiment

Since there is a strong correlation between the difference ΔBR in the luminance histogram and the black carbon content as shown above, this correlation is used as the calibration curve SC for calculating the data relating to black carbon content in the second embodiment, and thus the data relating to black carbon content is calculated.

Therefore, the calculation unit 4 in advance obtains the collection image data IM by imaging some collection areas with different black carbon contents or concentrations of black carbon, measures or calculates theoretically the difference ΔBR for each content or concentration using the collection image data IM, generates the calibration curve SC by associating the black carbon contents or concentrations with the differences ΔBR, and stores the calibration curve SC in the storage unit 43.

Figure 12:
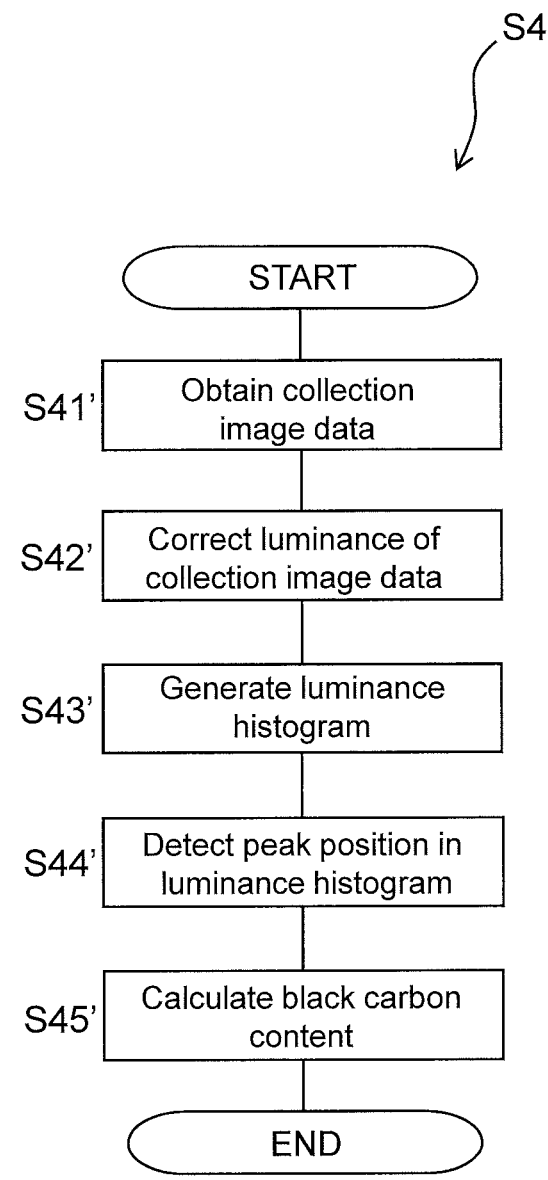
FIG. 12 is a flowchart showing an operation for analyzing fine particulate matter in a second embodiment.

Next, referring to FIG. 12, an operation for analyzing the fine particulate matter FP in the second embodiment is described. FIG. 12 is a flowchart showing the operation for analyzing the fine particulate matter FP in the second embodiment.

First, in Step S41', the collection image data IM is obtained.

Next, in Step S42', the calculation unit 4 performs the luminance correction process on the obtained collection image data IM. Specifically, an absolute value of a difference between luminance of each pixel in the second background data as image data indicating the non-collection area and luminance of a corresponding pixel in the collection image data IM is calculated for all pixels included in the collection image data IM, and thus the collection image data IM after the luminance correction (corrected image data IM') is calculated.

Before performing the luminance correction process described above, the calculation unit 4 performs a low-pass filtering process on the second background data to be used for the luminance correction process to remove a noise from the second background data. In this way, the luminance correction process can be appropriately performed.

In addition, the collection image data IM obtained by the two-dimensional sensor 3 was analyzed in detail, and it was found that luminance of the second image data Im2 included in the collection image data IM changes according to the black carbon content.

Therefore, luminance of the second image data Im2 of the collection image data IM before the luminance correction process is corrected based on the black carbon content and/or luminance of the first image data Im1.

Specifically, a function or the like indicating how luminance of the second image data Im2 changes according to the black carbon content (or luminance of the first image data Im1) is first obtained in advance. Then, luminance of the second image data Im2 included in the collection image data IM is corrected by using the above function, and thus the second image data Im2 after the correction, which is not affected by the black carbon, can be obtained.

Figure 13:
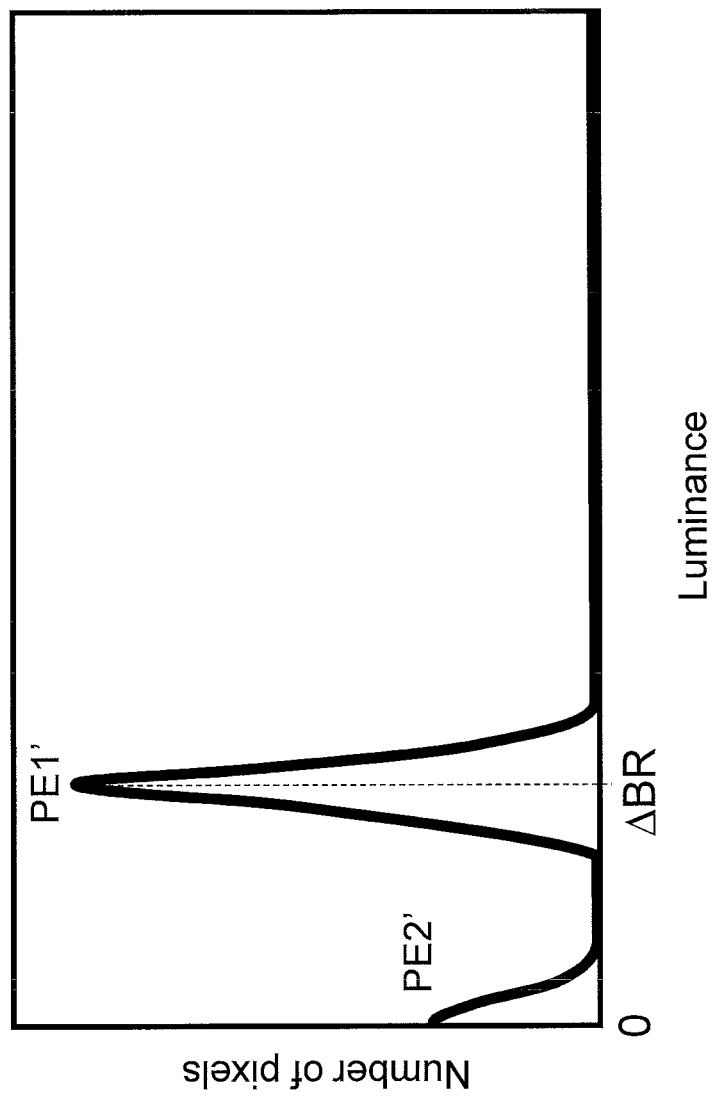
FIG. 13 is a diagram showing one example of a luminance histogram of corrected image data.

After calculating the corrected image data IM', in Step S43', the calculation unit 4 scans pixels included in the corrected image data IM', for example, to count the number of pixels having specific luminance, associates the luminance with the number of pixels having this luminance, and generates the luminance histogram as shown in FIG. 13. FIG. 13 is a diagram showing one example of the luminance histogram of the corrected image data.

The luminance histogram shown in FIG. 13, which is calculated from the collection image data IM shown in (3) of FIG. 4, has a first peak PEP and a second peak PE2'. The second peak PE2' appears when the luminance is nearly 0, and the first peak PE1' appears when the luminance is ΔBR.

When the luminance histogram is generated from the corrected image data IM', the data relating to black carbon content can be easily calculated only by detecting a position (luminance) of the first peak PE1' in the luminance histogram. It is because the position (luminance) of the first peak PE1' in the luminance histogram of the corrected image data IM' is equal to the difference ΔBR between the first luminance Br1 and the second luminance Br2.

In addition, the corrected image data IM' is image data obtained by removing the background such as noise from the collection image data IM, and hence the data relating to black carbon content can be calculated more accurately by using the luminance histogram generated from the corrected image data IM'.

Then, in Step S44', the calculation unit 4 adds the number of pixels included in each luminance in order from the maximum luminance side in the luminance histogram of the corrected image data IM', for example, and detects the luminance value when the sum number of pixels becomes half the number of pixels included in the first image data Im1 (after the luminance correction), as the luminance value when the first peak PE1' appears.

The above-mentioned luminance value when the sum number of pixels becomes "half the number of pixels included in the first image data Im1" corresponds to a representative value in the distribution of luminance of pixels included in the first image data Im1.

After the first peak PE1' is detected, in Step S45', the calculation unit 4 calculates the data relating to black carbon content in the collection area using the detected luminance value and the calibration curve SC stored in the storage unit 43.

In this way, when performing Steps S41' to S45', by using the luminance histogram calculated from the collection image data IM, the data relating to black carbon content can be accurately calculated.

Figure 14:
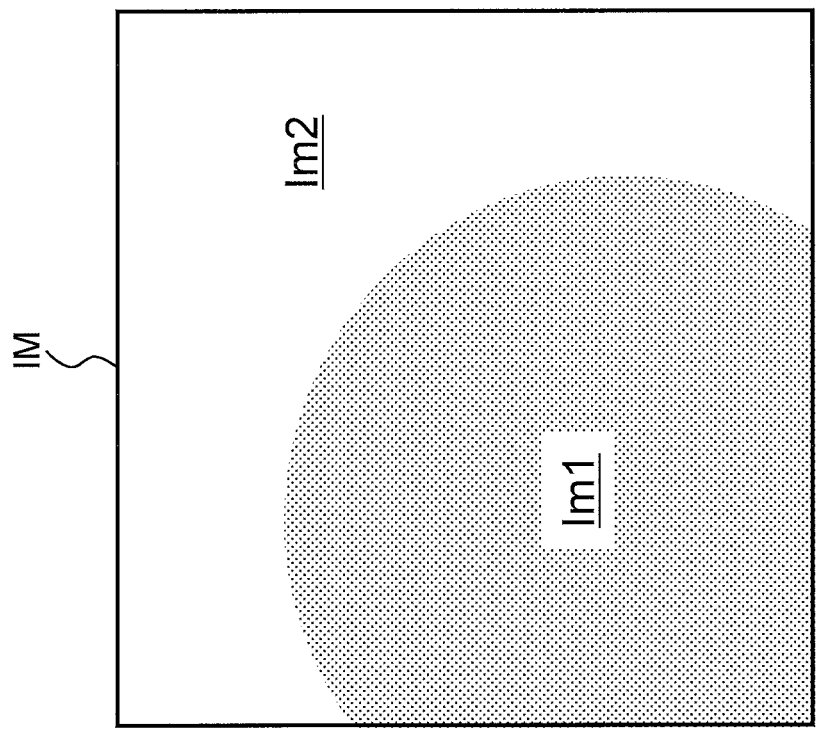
FIG. 14 is a diagram showing one example of the collection image data in which the first image data is partially missing.

The method of using the luminance histogram is particularly advantageous in that the data relating to black carbon content can be appropriately calculated even if the collection image data IM is obtained in which a part of the first image data Im1 is missing as shown in FIG. 14. FIG. 14 is a diagram showing one example of the collection image data in which a part of the first image data is missing.

It is because when a part of the first image data Im1 is missing in the collection image data IM, a ratio between an area of the first image data Im1 and an area of the second image data Im2 included in the collection image data IM is changed, while the luminance values at which the first peak PE1 and the second peak PE2 appear are not changed.

3. Third Embodiment

Figure 15:
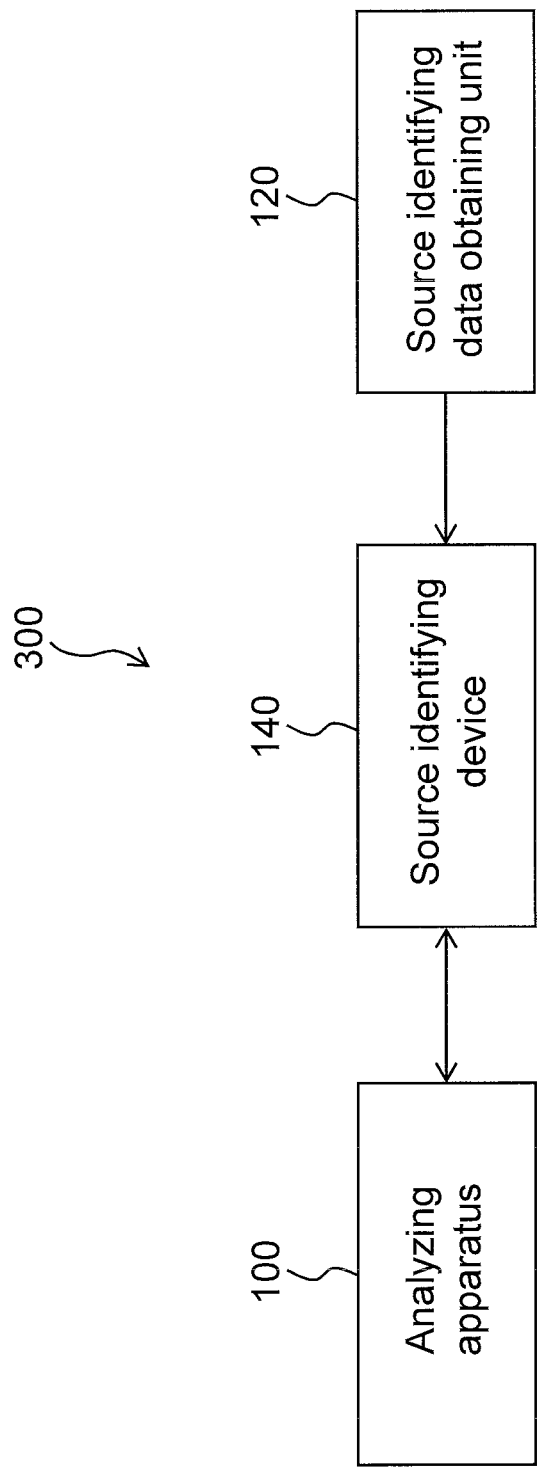
FIG. 15 is a diagram showing a structure of a system according to a third embodiment.

The analyzing apparatus 100 described above can also be used for a system that identifies a source of the fine particulate matter FP containing black carbon. A system 300 according to a third embodiment includes the analyzing apparatus 100, a source identifying data obtaining unit 120, and a source identifying device 140 as shown in FIG. 15. FIG. 15 is a diagram showing a structure of the system according to the third embodiment.

The source identifying data obtaining unit 120 is, for example, an anemoscope, and/or a gas analyzing apparatus that analyzes gases included in the air A (e.g. hydrocarbon, carbon monoxide (CO), carbon dioxide ($CO_2$), nitrogen oxide ($NO_x$), ozone ($O_3$), sulfur oxide ($SO_x$), and etc.), and obtains data that is used for identifying a source of the fine particulate matter FP.

The source identifying device 140 is a computer system that identifies a source of the fine particulate matter FP based on data obtained by the analyzing apparatus 100 and the source identifying data obtaining unit 120 (e.g. the wind direction, the gas component in the air A, the data relating to black carbon content, the concentration of fine particulate matter FP, and/or the element analysis result of the fine particulate matter FP).

It should be noted that the source identifying device 140 may be disposed separately from the calculation unit 4 of the analyzing apparatus 100, or the function thereof may be incorporated in the calculation unit 4.

Sources of the black carbon and/or the fine particulate matter FP containing a specific element are well known. For example, the black carbon is generated when a fuel is burned. In addition, if the fine particulate matter FP contains calcium (Ca), aluminum (Al), silicon (Si), and potassium (K), for example, the fine particulate matter FP is identified as soil or yellow sand.

In addition, for example, main sources of hydrocarbon, carbon monoxide (CO), carbon dioxide ($CO_2$), nitrogen oxide ($NO_x$), and sulfur oxide ($SO_x$) are roads having heavy traffic.

Therefore, when the system 300 has the structure described above, sources of the fine particulate matter FP, the black carbon, and/or gases included in the air A can be identified from the analysis result of the fine particulate matter FP and/or the black carbon collected by the analyzing apparatus 100 and the gas analysis result obtained by the source identifying data obtaining unit 120.

According to another embodiment, a plurality of the systems 300 described above, which are disposed at different positions, may be connected to each other via a network or the like such that their data can be communicated. In this way, by using data relating to sources of the fine particulate matter FP obtained by other system 300, sources of the fine particulate matter FP and the like can be identified more accurately.

According to still another embodiment, the plurality of systems 300 disposed at different positions may be connected to a server. In this way, data relating to the sources obtained by the plurality of systems 300 can be integrally managed by the server.

4. Fourth Embodiment

After performing analysis of the fine particulate matter FP at the analysis position, it is possible to move the collection filter 1 by a distance shorter than the distance between the collection position and the imaging position, to move the non-collection area to the imaging position. When the non-collection area reaches the imaging position, the two-dimensional sensor 3 may obtain the image data of the view field area VA including the non-collection area.

In this way, the image data indicating the non-collection area that is used for background correction or the like can be obtained without using the discrete two-dimensional sensor 3 or the like, for example.

After obtaining the image data of the view field area VA including the non-collection area by moving the non-collection area to the imaging position, the calculation unit 4 further moves the collection filter 1 such that a new collection area to be analyzed is moved to the analysis position, and starts analysis of the fine particulate matter FP collected in the new collection area.

As described above, since the image data obtaining time of the two-dimensional sensor 3 is very short, a period during which the non-collection area stays at the imaging position can be shortened in the movement of the collection filter 1 described above. As a result, the image data indicating the non-collection area (the background image data and the second background data) can be obtained without substantially decreasing efficiency of collection and analysis of the fine particulate matter FP in the analyzing apparatus 100.

5. Other Embodiments

Although the embodiments of the present invention are described above, the present invention is not limited to the embodiments described above, which can be modified variously within the scope of the invention without deviating from the spirit thereof. In particular, the plurality of embodiments and variations described in this specification can be arbitrarily combined as necessary.

(A) The two-dimensional sensor 3 may have a function for checking whether or not the collection area is deviated from the imaging position or the analysis position. In this case, the display 45 displays the image data obtained by the two-dimensional sensor 3 in a visually recognizable form. In this way, it is possible to check whether or not the collection area is deviated from the imaging position or the analysis position prior to the analysis.

If the collection area is deviated from the imaging position or the analysis position, the collection filter 1 may be moved manually or automatically such that the collection area is positioned at the imaging position or the analysis position.

In addition, by visually displaying the image data as described above, it is also possible to check whether or not there is a foreign matter at the imaging position or the analysis position.

(B) The sensor for checking whether or not the collection area is deviated from the imaging position or the analysis position (such as an image sensor or a camera) may be disposed separately from the two-dimensional sensor 3.

(C) As long as a size of the plate member 5 is larger than the collection area, the plate member 5 may cover an area other than the imaging position.

(D) A sensor that can obtain a color image may be used as the two-dimensional sensor 3. In this way, information about hue of the collection image data IM and the like and output difference of each color can be obtained.

The color of the fine particulate matter FP is changed according to the type. For example, if the main component of the fine particulate matter FP is yellow sand, the collection image data IM bears yellow color. If the main component is iron oxide, copper, or brown carbon, the collection image data IM bears red color or brown color. Further, if the main component is ash generated by open burning or cement, the collection image data IM bears white color or gray color.

Therefore, if a color image can be obtained as the collection image data IM, data relating to components included in the fine particulate matter FP can be obtained based on hue or the like of the collection image data IM.

In addition, by using the two-dimensional sensor 3 such as a "hyper spectrum camera" having a special color filter, more detailed data relating to hue of the collection image data IM can be obtained.

(E) When obtaining the image data indicating the non-collection area, it is possible to use the image data as the second background data, and to calculate a difference between a luminance value of each pixel in the collection image data IM and a luminance value of a corresponding pixel in the image data indicating the non-collection area, for example to generate the corrected data.

(F) It is possible to extract the first image data Im1 by performing image processing on the collection image data IM. For example, a Laplacian filter may be used on the collection image data IM to detect edges, and among the detected edges, an edge indicating characteristics of the collection area (circular shape) may be extracted by Hough conversion (or similar algorithm) to extract the first image data Im1 (a part corresponding thereto) from the collection image data IM.

(G) If the collection image data IM in which a part of the collection area is missing is obtained as shown in FIG. 14, the calculation unit 4 may correct the integrated value of luminance of pixels included in the extracted first image data Im1.

Specifically, for example, the center and radius of a circle are calculated from the image of the collection area having a missing part, and the missing part is "patched" to virtually generate a complete shape of the collection area. Then, the actually calculated integrated luminance distribution is complemented by the integrated luminance distribution corresponding to the missing part to correct the integrated luminance distribution. By further integrating the integrated luminance distribution after the correction, the integrated value of luminance of pixels included in the extracted first image data Im1 can be corrected.

It is also possible to correct the integrated value of luminance of pixels included in the first image data Im1 by multiplying the integrated value of luminance of pixels included in the first image data Im1 by a ratio between the number of pixels to be included in the complete collection area and the number of pixels included in the actually obtained first image data Im1.

(H) The luminance value at the first peak PEP in the corrected image data IM' may be a luminance value at which the maximum value of the number of pixels appears in the area other than zero luminance or its vicinity (on the low luminance side) when scanning the luminance histogram in the luminance direction, for example.

(I) The calculation result of the data relating to black carbon content using the collection image data IM, the collection amount measured value using β-rays, and/or the element analysis result of the fine particulate matter FP collected in the collection area may be combined to newly calculate the data relating to black carbon content.

For example, a data value relating to content of the black color fine particulate matter FP other than black carbon obtained from the element analysis result is subtracted from the calculation result of the data relating to black carbon content using the collection image data IM, and thus the data relating to black carbon content can be calculated more accurately.

(J) The collection image data IM for calculating data relating to content of the colored particulate matter is not limited to the reflection image described in the first embodiment and the second embodiment but may be a transmission image.

The collection image data IM as the transmission image can be obtained, for example, by disposing the two-dimensional sensor 3 on the opposite side to the side of the collection filter 1 on which the fine particulate matter FP is collected, and by receiving light after passing through the collection area and its vicinity with the two-dimensional sensor 3.

(K) When using a plastic scintillator detector as the β-ray detector 73 of the collection amount measuring unit 7, the β-ray detector 73 may be irradiated with ultraviolet rays, and the data relating to content of the colored particulate matter may be calculated based on a transmittance difference of ultraviolet rays absorbed by the colored particulate matter (black carbon). In this way, the data relating to content of the colored particulate matter can be easily obtained without largely modifying the analyzing apparatus 100.

Figure 16:
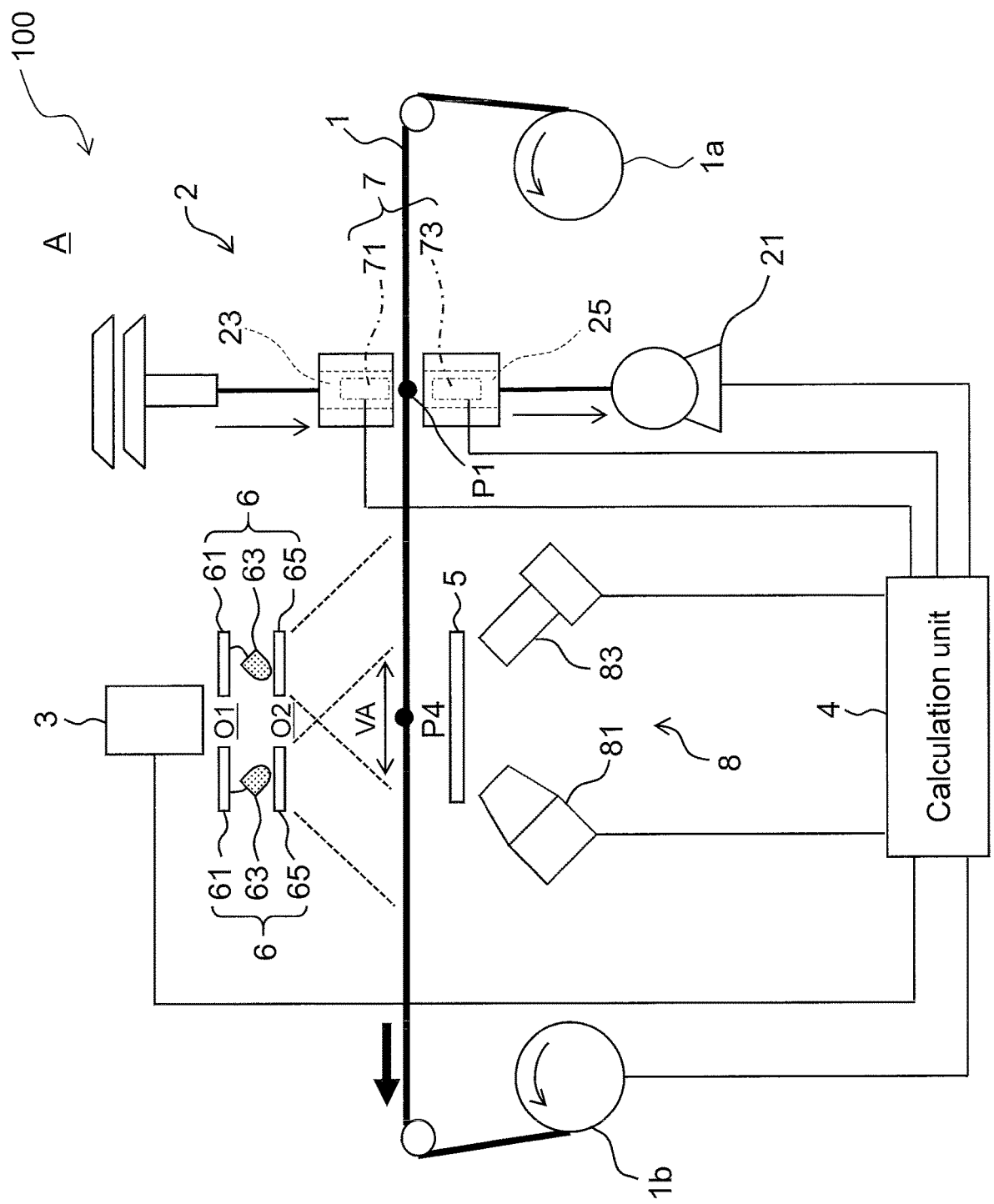
FIG. 16 is a diagram showing another structural example of the analyzing apparatus.

(L) It is also possible to adopt a structure of the analyzing apparatus 100 as illustrated in FIG. 16. For example, the two-dimensional sensor 3 may be disposed at a fourth position P4 in the length direction of the collection filter 1 so that the "imaging position" is the fourth position P4, and a light source other than the surface mount type white color LED, such as a general LED, may be used as the light source 6 (a light irradiation element 63).

In this case, a diffuser panel 65 for diffusing light from the light irradiation element 63 mounted on a substrate 61 is disposed just in front of the light irradiation element 63. FIG. 16 is a diagram illustrating another structural example of the analyzing apparatus.

In addition, in the embodiment illustrated in FIG. 16, the fourth position P4 is disposed above the element analysis unit 8. In other words, the imaging position coincides with the analysis position. It should be noted that the fourth position P4 may be shifted from the analysis position. In addition, the fourth position P4 may be the same as the second position P2 described in the first embodiment or may be different therefrom.

The present invention can be widely applied to analyzing apparatus for analyzing colored particulate matter.

What is claimed is:

1. An analyzing apparatus comprising:
a collection filter collecting particulate matter included in the atmosphere;
a two-dimensional sensor obtaining two-dimensional collection image data including two-dimensional first image data indicating a collection area of the collection filter in which the particulate matter is collected, and two-dimensional second image data indicating a non-collection area of the collection filter in which the particulate matter is not collected; and
a calculation unit configured to calculate data relating to content of colored particulate matter included in the collection area based on an integrated value of a first luminance of pixels in the first image data, or based on the first luminance and a second luminance of pixels in the second image data.

2. The analyzing apparatus according to claim 1, further comprising a plate member disposed on a side opposite to a side of the collection filter facing the two-dimensional sensor.

3. The analyzing apparatus according to claim 1, further comprising a collection amount measuring unit configured to calculate data relating to collection amount of the particulate matter collected by the collection filter, based on an intensity of β-rays passing through the particulate matter collected on the collection filter.

4. The analyzing apparatus according to claim 1, further comprising an element analysis unit configured to analyze an element included in the particulate matter collected by the collection filter.

5. The analyzing apparatus according to claim 1, wherein the calculation unit outputs the collection image data in a visually recognizable form.

6. The analyzing apparatus according to claim 1, wherein the calculation unit stores the collection image data and an analysis result of the particulate matter collected in the collection area indicated in the collection image data, in association with time when the collection image data is obtained.

7. The analyzing apparatus according to claim 1, wherein the calculation unit calculates first background data indicating a background of luminance of pixels in the collection image data using the second luminance, and calculates the data relating to content of the colored particulate matter based on the corrected data calculated based on the collection image data and the first background data.

8. The analyzing apparatus according to claim 1, wherein the calculation unit calculates the data relating to content of the colored particulate matter based on the first luminance at which a first peak appears in distribution of luminance of pixels in the first image data and the second luminance at which a second peak appears in distribution of luminance of pixels in the second image data.

9. The analyzing apparatus according to claim 1, wherein the two-dimensional sensor obtains second background data as two-dimensional image data when the particulate matter is not collected on a surface of the collection filter corresponding to at least a part of a view field of the two-dimensional sensor, and
the calculation unit calculates the data relating to content of the colored particulate matter based on corrected image data calculated based on the collection image data and the second background data.

10. A system comprising:
an analyzing apparatus comprising:
a collection filter collecting particulate matter included in the atmosphere;
a two-dimensional sensor obtaining two-dimensional collection image data containing two-dimensional first image data indicating a collection area of the collection filter in which the particulate matter is collected, and two-dimensional second image data indicating a non-collection area of the collection filter in which the particulate matter is not collected; and
a calculation unit configured to calculate data relating to content of colored particulate matter included in the collection area based on an integrated value of a first luminance of pixels in the first image data, or based on the first luminance and a second luminance of pixels in the second image data;
and
a source identifying device configured to identify a source of the particulate matter based on data that is used to identify a source of the particulate matter and data obtained by the analyzing apparatus.

11. An analyzing method comprising the steps of:
collecting particulate matter included in the atmosphere on a collection filter;
obtaining two-dimensional collection image data containing two-dimensional first image data indicating a collection area of the collection filter in which the particulate matter is collected, and two-dimensional second image data indicating a non-collection area of the collection filter in which the particulate matter is not collected; and
calculating data relating to content of colored particulate matter included in the particulate matter based on an integrated value of a first luminance of pixels in the first image data, or based on the first luminance and a second luminance of pixels in the second image data.

12. A non-transitory computer readable storage product having stored data representing a program for causing a computer to perform an analyzing method comprising the steps of:
collecting particulate matter included in the atmosphere on a collection filter;
obtaining two-dimensional collection image data containing two-dimensional first image data indicating a collection area of the collection filter in which the particulate matter is collected, and two-dimensional second image data indicating a non-collection area of the collection filter in which the particulate matter is not collected; and
calculating data relating to content of colored particulate matter in the atmosphere based on an integrated value of a first luminance of pixels in the first image data, or based on the first luminance and a second luminance of pixels in the second image data.

* * * * *